US011404873B2

(12) United States Patent
Kirihara et al.

(10) Patent No.: US 11,404,873 B2
(45) Date of Patent: Aug. 2, 2022

(54) POWER SYSTEM OPERATION ASSISTING DEVICE AND METHOD, AND OSCILLATION SUPPRESSION SYSTEM

(71) Applicant: HITACHI, LTD., Tokyo (JP)

(72) Inventors: Kenta Kirihara, Tokyo (JP); Akira Tsubota, Tokyo (JP); Yutaka Kokai, Tokyo (JP); Sumito Tobe, Tokyo (JP); Masahiro Yatsu, Tokyo (JP); Hiroo Horii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 81 days.

(21) Appl. No.: 17/047,158

(22) PCT Filed: Mar. 11, 2019

(86) PCT No.: PCT/JP2019/009829

§ 371 (c)(1),
(2) Date: Oct. 13, 2020

(87) PCT Pub. No.: WO2019/244422

PCT Pub. Date: Dec. 26, 2019

(65) Prior Publication Data

US 2021/0126453 A1 Apr. 29, 2021

(30) Foreign Application Priority Data

Jun. 22, 2018 (JP) ............................ JP2018-118424

(51) Int. Cl.
*H02J 3/06* (2006.01)
*H02J 13/00* (2006.01)

(52) U.S. Cl.
CPC .......... *H02J 3/06* (2013.01); *H02J 13/00001* (2020.01)

(58) Field of Classification Search
CPC ........ H02J 3/06; H02J 13/00001; H02J 13/00; H02J 3/00
See application file for complete search history.

(56) References Cited

U.S. PATENT DOCUMENTS

2011/0282508 A1 11/2011 Goutard
2018/0054059 A1* 2/2018 Yamazaki .......... H02J 13/0006

OTHER PUBLICATIONS

S. Maslennikov, et al. "Locating the Source of Sustained Oscillations by Using PMU measurements", IEEE Power and Energy Society General Meeting, 2017 cited in the original specification.

(Continued)

*Primary Examiner* — Rexford N Barnie
*Assistant Examiner* — Thai H Tran
(74) *Attorney, Agent, or Firm* — Mattingly & Malur, PC

(57) ABSTRACT

This power system operation assisting device is provided with: a multiple signal frequency specifying unit that uses, as inputs, measured data of an object to be measured and a frequency specifying parameter for calculating a frequency component of the measured data to calculate an oscillation frequency; a generation source candidate calculation unit that uses, as an input, the calculated oscillation frequency to calculate a generation source candidate of an unstable oscillation occurring in a power system; a generation source guarantee test unit that calculates the guarantee test result of the generation source candidate; and a display unit that displays the oscillation frequency, the generation source candidate, and the guarantee test result.

9 Claims, 20 Drawing Sheets

(56) References Cited

OTHER PUBLICATIONS

Bin Wang, Kai Sun, “Location methods of oscillation sources in power systems: a survey”, 2016, J. Mod. Power Syst. Clean Energy, 2017, 5(2), p. 151-159.
International Search Report PCT/JP2019/009829 dated May 21, 2019.

* cited by examiner

| TIME | MEASUREMENT VALUE | MEASUREMENT INFORMATION |
|---|---|---|
| 2016/12/15 10:52 | 100 | BUS 13, VOLTAGE |
| 2016/12/15 10:52 | 10 | BUS 123, PHASE |
| 2016/12/15 10:52 | .10 | ....... |

| NAME | MODEL TYPE | DETAILS |
|---|---|---|
| GENERATOR A | GENROU MODEL | H=4.5<br>X'=1.24<br>... |
| LOAD A | LOAD MODEL | P=4.12MW<br>Q=.5MVar |
| TRANSMISSION LINE A | STATIC MODEL | X=.024 Ohm<br>R=1.2 Ohm |
| ..... | ...... | ..... |

| | ACCELERATION ENERGY OF 0.4 Hz DOMAIN | ACCELERATION ENERGY OF 1.2 Hz DOMAIN |
|---|---|---|
| BUS A | −0.1 | −0.1 |
| BUS B | −0.2 | 1.0 |
| BUS C | 1.0 | 0.2 |

| | ACCELERATION ENERGY OF 0.4 Hz DOMAIN | ACCELERATION ENERGY OF 1.2 Hz DOMAIN |
|---|---|---|
| GENERATION SOURCE 1 | BUS C | BUS B |
| GENERATION SOURCE 2 | ――― | BUS C |

| | GENERATION SOURCE OF 0.4 Hz DOMAIN | GENERATION SOURCE OF 1.2 Hz DOMAIN |
|---|---|---|
| MODE CLUSTERING TEST | ○ | ○ |
| SIMULATION REPRODUCTION TEST | × | ○ |
| TRAVELING WAVE TEST | ○ | ○ |

○: AGREEING WITH TEST RESULT

×: DISAGREEING WITH TEST RESULT

| | GENERATION SOURCE OF 0.4 Hz DOMAIN | GENERATION SOURCE OF 1.2 Hz DOMAIN |
|---|---|---|
| SIMULATION REPRODUCTION TEST | ○ | ○ |
| MODE CLUSTERING TEST | × | ○ |
| TRAVELING WAVE TEST | ○ | ○ |

POWER SYSTEM OPERATION ASSISTING DEVICE AND METHOD, AND OSCILLATION SUPPRESSION SYSTEM

TECHNICAL FIELD

The present invention relates to a power system operation assisting device and method, and an oscillation suppression system.

BACKGROUND ART

The power system is becoming more and more complicated due to the introduction of renewable energy and the deterioration of facilities. Therefore, it becomes difficult to stabilize the power system, causing unstable oscillation in the power system. Since this unstable oscillation may induce a power failure in the power system, it is necessary to stabilize the power system by identifying and controlling a generation source. However, it is difficult to identify the generation source because unstable oscillation affects multiple places in the power system.

The following techniques are known as background techniques in the technical field related to the present invention.

Patent literature 1 describes, as the problem, that "while the power system becomes more and more complex, facilities are not introduced, and there is a lack of applications that make the best use of existing facilities to stably supply the power (translation)." As a solution, according to the description, "The unstable oscillation is estimated off-line by using the oscillation stability analysis based on inputs such as phasor data, topology data, event logs, and protection settings of unstable events that occurred in the past. This result is used to review the protection control method and propose an operation method (translation)."

Nonpatent literature 1 describes "the technique that identifies an oscillation frequency from the measured data based on the Fourier analysis, estimates the energy of a generator and loads in the oscillation frequency domain, and identifies the generation source of unstable oscillation (translation)."

Nonpatent literature 2 describes that "The technique to calculate generation source candidates of unstable oscillation is used to create a library of unstable oscillation generation sources by (i) confirming continuation of the unstable oscillation after isolation of the generation source and (ii) confirming the same by using data inside the power plant, for example. The unstable oscillation library is used to identify the generation source (translation)."

CITATION LIST

Patent Literature

Patent Literature 1: U.S. Patent Application Publication No. 2011/0282508

Nonpatent Literature

Nonpatent Literature 1: S. Maslennikov, Bin Wang, Eugene Litvinov, "Locating the Source of Sustained Oscillations by Using PMU measurements," IEEE Power and Energy Society General Meeting, 2017

Nonpatent Literature 2: Bin Wang, Kai Sun, "Location methods of oscillation sources in power systems: a survey", 2016

SUMMARY OF INVENTION

Technical Problem

According to patent literature 1, the offline analysis identifies the generation source of unstable oscillation by using past data of unstable oscillation. However, the objective is to identify the generation source of unstable oscillation by using the offline analysis. It is impossible to identify the generation source of an unknown unstable event occurring online.

Nonpatent literature 1 estimates the energy of a generator and load energy in the oscillation frequency domain calculated by the Fourier analysis, and identifies the generation source of unstable oscillation, thereby making it possible to identify the generation source of unstable oscillation in real time. However, the frequency identification using the Fourier analysis requires a long analysis window after the occurrence of unstable oscillation. It takes time to identify the generation source. During that time, the unstable oscillation of the power system may worsen, possibly causing a power failure.

The technique according to nonpatent literature 2 calculates generation source candidates of unstable oscillation. An operator determines the degree of suppressing the unstable oscillation to evaluate the generation source candidates. However, such a technique makes the evaluation unavailable until the actual operation is performed. As a result, a useless operation may be performed. Therefore, it is necessary to perform a guarantee test on the calculated generation source and provide the operator with the result to conduct more accurate determination.

To solve the above-mentioned issue, the present invention provides a system operation assisting device and method, and an oscillation suppression system presenting a generation source of real-time occurring unstable oscillation and results of an assurance test on the identified generation source.

Solution to Problem

To solve the above-described issue, a representative aspect of the present invention provides a power system operation assisting device including a multi-signal frequency identification portion that calculates an oscillation frequency by using input such as measurement data for a measurement target and a frequency identification parameter to calculate a frequency component of the measurement data; a generation source candidate calculation portion that calculates a generation source candidate of unstable oscillation occurring in a power system by using input such as a calculated oscillation frequency; a generation source assurance test portion that calculates an assurance test result concerning the generation source candidate; and a display portion that displays the oscillation frequency, the generation source candidate, and the assurance test result.

Advantageous Effects of Invention

The present invention can provide a power system operation assisting device and method, and an oscillation suppression system capable of assisting a power system operator in operations.

More specifically, an embodiment of the present invention can fast provide the operator with the generation source of unstable oscillation and the assurance test result by using the multi-signal frequency identification portion and the generation source assurance test of a generation source identification portion, making it possible to assist the operator in suppressing unstable oscillation.

Description of the embodiments below will clarify issues, configuration, and effects other than those mentioned above.

BRIEF DESCRIPTION OF DRAWINGS

FIG. 3 is a diagram illustrating measurement data stored in a measurement data database;

FIG. 5 is a diagram illustrating genealogical model data;

FIG. 13 is a diagram illustrating calculation of generation source candidates based on relative merits of acceleration energy in the generation source candidate calculation portion;

FIG. 14 is a diagram illustrating generation source candidates;

FIG. 18 is a diagram illustrating the principle of a simulation reproduction test as an example assurance test in the generation source assurance test;

DESCRIPTION OF EMBODIMENTS

Embodiments of the present invention will be described in further detail with reference to the accompanying drawings. The description below explains just the embodiments. The invention itself is not intended to be limited to the following specific contents.

First Embodiment

The first embodiment is used to describe the power system operation assisting device and method according to embodiments of the present invention. The first embodiment shows a case of applying the power system operation assisting device to stabilized operations of a power system.

The description below explains the overall configuration of a power system operation assisting device 1 according to the first embodiment with reference to FIGS. 1 and 2.

Figure 1:
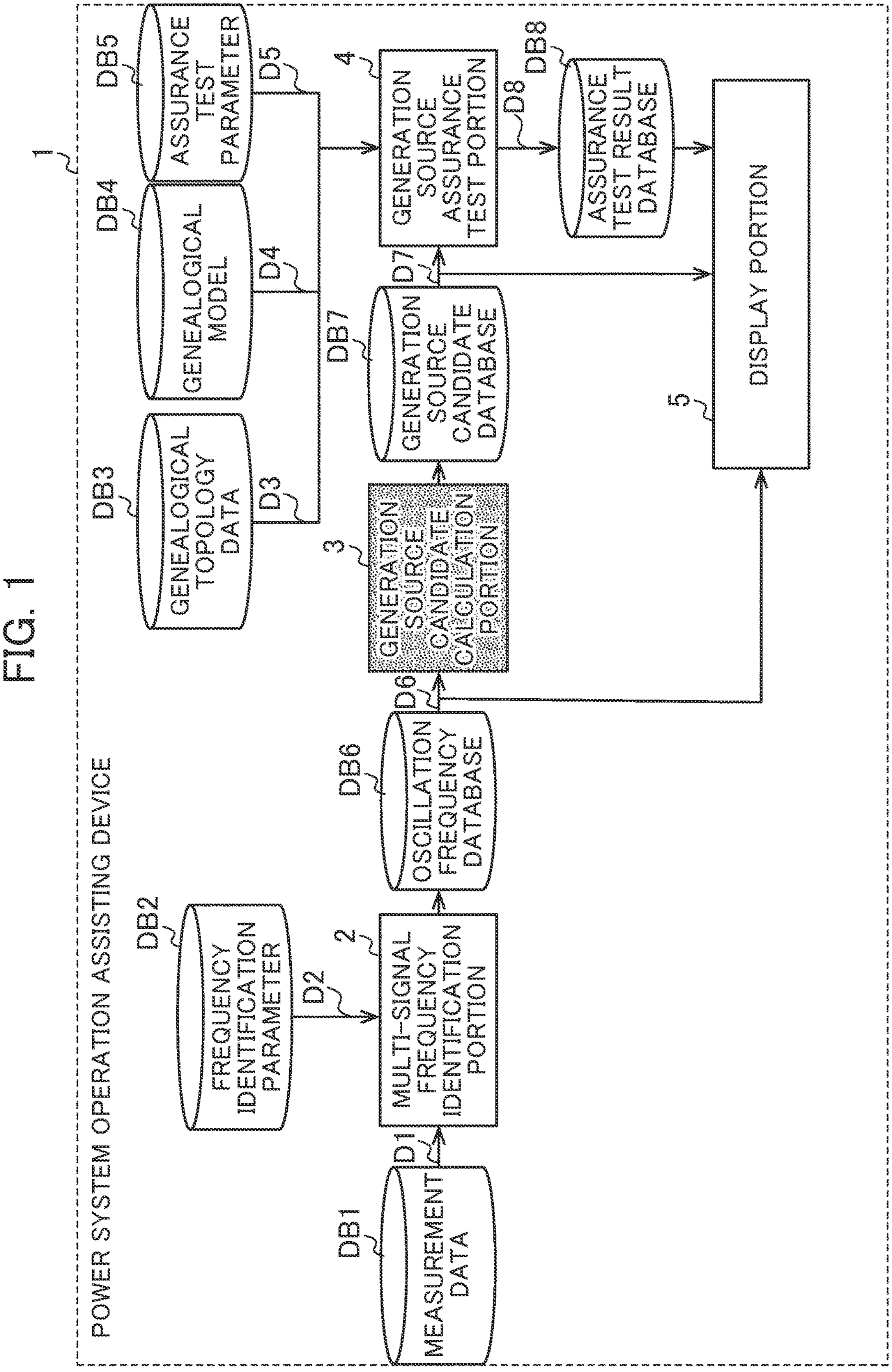
FIG. 1 is a diagram illustrating an overall configuration of a power system operation assisting device according to a first embodiment.

FIG. 1 is a diagram illustrating an overall configuration of the power system operation assisting device 1 according to the first embodiment. The power system operation assisting device 1 is configured as a computer system. FIG. 1 uses a block diagram to represent databases DBs included in the power system operation assisting device 1 and internal processing functions.

The power system operation assisting device 1 includes databases DBs such as a measurement data database DB1, a frequency identification parameter database DB2, a genealogical topology data database DB3, a genealogical model database DB4, an assurance test parameter database DB5, an oscillation frequency database DB6, a generation source candidate database DB7, and an assurance test result database DB8.

The power system operation assisting device 1 includes processing functions such as a multi-signal frequency identification portion 2, a generation source candidate calculation portion 3, a generation source assurance test portion 4, and a display portion 5. Other databases and processing functions may be provided as needed.

The measurement database DB1 stores measurement data D1. FIG. 3 is a diagram illustrating the measurement data D1. The measurement data D1 acquired from measurement targets of a power system 12 includes time D11, measurement value D12, and measurement information D13, for example. These may be collected from measurement targets at multiple points of the power system 12 or may include various information about a measuring instrument 10 described later. These pieces of information may represent a date of introduction of the measuring instrument 10, an average error, a manufacturer, a type, a serial number, a product number, an operating time, and an operating rate, for example.

The frequency identification parameter database DB2 stores a frequency identification parameter D2. The frequency identification parameter D2 includes the definition of a defect complementing method used at process step S102, a threshold value for the correlation coefficients used at process step S103, the technique of calculating frequency components at process step S104, and a screening threshold value used at process step S105 to be described later.

Figure 4:
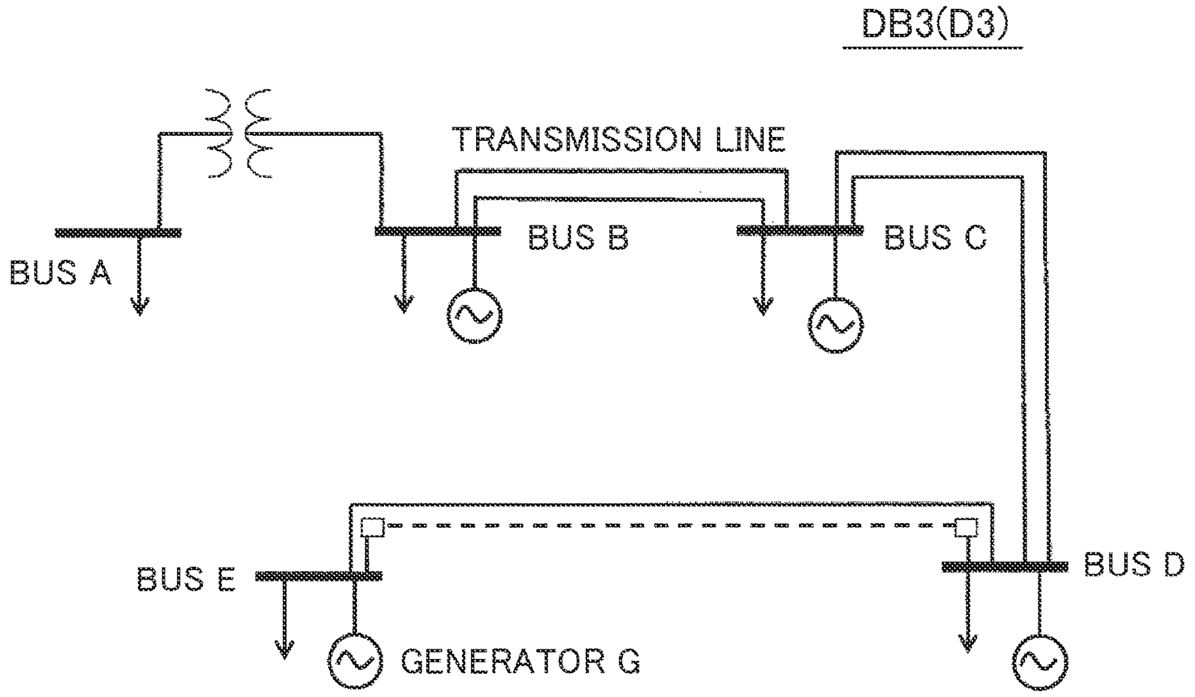
FIG. 4 is a diagram illustrating genealogical topology data.

The genealogical topology data database DB3 stores genealogical topology data D3. FIG. 4 is a diagram illustrating the genealogical topology data D3. The genealogical topology data D3 represents the connection states of various devices and instruments of the power system 12. The genealogical topology data D3 indicates connections such as bus B, transmission line L, generator G, load Ld, STATCOM, and SVR of the power system, for example. The genealogical topology data D3 is used to nearly maximally recognize the device information that can be recognized in the power system.

The genealogical model database DB4 stores genealogical model data D4. FIG. 5 is a diagram illustrating the genealogical model data D4. The genealogical model data D4 includes power system parameters needed to analyze the power system 12. The power system parameters may include a generator model, a transmission line model, and a load model in the power system, for example.

The assurance test parameter database DB5 stores an assurance test parameter D5. The assurance test parameter D5 includes a list of test cases and test types for performing an assurance test. The test types will be described later.

The oscillation frequency database DB6 stores an oscillation frequency D6. The oscillation frequency D6 represents the frequency of an unstable event in the power system.

The generation source candidate database DB7 stores a generation source candidate D7. The generation source candidate D7 represents a calculated oscillation frequency domain and generation source candidates in the domain.

The assurance test result database DB8 stores assurance test results.

The multi-signal frequency identification portion 2 generates the oscillation frequency database DB6 by using inputs as data in the measurement database DB1 and the frequency identification parameter database DB2.

The generation source candidate calculation portion 3 generates the generation source candidate database DB7 by using inputs as data in the oscillation frequency database DB6.

The generation source assurance test portion 4 generates the generation source candidate database DB7 by using inputs as data in the oscillation frequency database DB6, the genealogical topology database DB3, the genealogical model database DB4, and the assurance test parameter DB5.

The display portion 5 displays support information by using inputs from the oscillation frequency database DB6, the generation source candidate database DB7, and the assurance test result database DB8.

Figure 2:
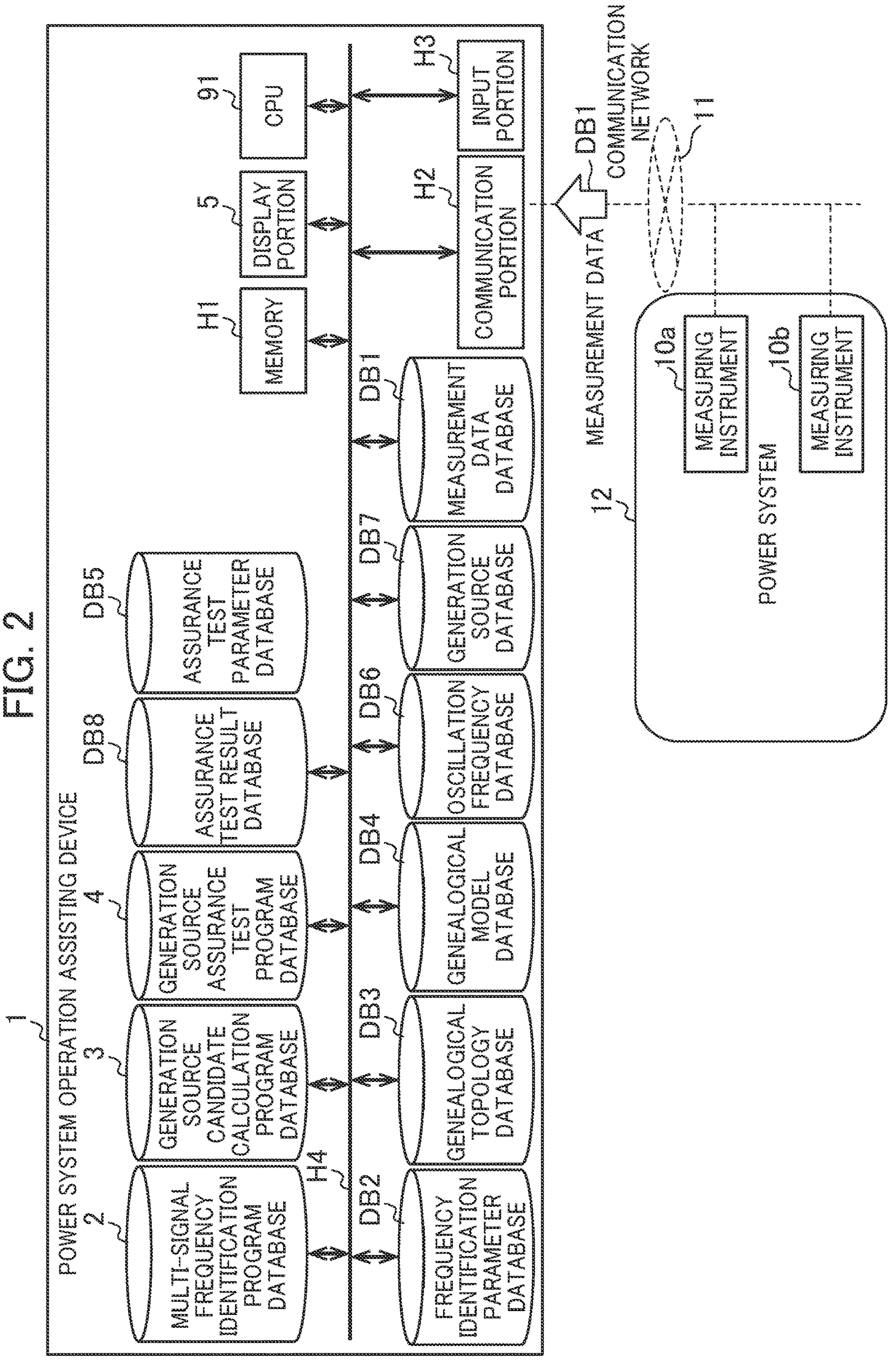
FIG. 2 is a diagram illustrating a hardware configuration of the power system operation assisting device a configuration of the power system according to the first embodiment.

FIG. 2 is a diagram illustrating a hardware configuration of the power system operation assisting device 1 and a configuration of the power system 12 according to the first embodiment.

FIG. 1 illustrates the system operation assisting device 1 from the viewpoint of the databases DBs and the processing functions. FIG. 2 illustrates the same from the viewpoint of the hardware configuration. As the hardware configuration, the system operation assisting device 1 includes a database DB, memory H1, a communication portion H2, an input portion H3, a CPU 91, a display portion 5, a plurality of program databases, and a bus H4 connecting these. The configuration of the databases DBs is equal to that in FIG. 1.

The program databases include a multi-signal frequency identification program database 2, a generation source candidate calculation program database 3, and a generation source assurance test program database 4.

The multi-signal frequency identification program database 2 stores a sequence to identify unstable oscillation from measurement data on multiple signals. The generation source candidate calculation program database 3 stores a sequence to identify an oscillation generation source based on the oscillation frequency of the unstable oscillation. The generation source assurance test program database 4 stores a test sequence and an evaluation method to ensure the identified generation source.

The input portion H3 includes at least one of a keyboard switch, a pointing device such as a mouse, a touch panel, a tablet, an eye-level estimation device using a camera, a brain wave conversion device, and a voice instruction device, for example. The input portion H3 is not limited thereto and may be available as other user interfaces.

The communication portion H2 includes a circuit and a communication protocol for connection to a communication network 11.

The memory H1 is configured as RAM (Random Access Memory), stores computer programs read from the program databases 2 and 3, and stores calculation result data and image data necessary for processes, for example. The memory H1 temporarily stores the measurement data database DB1, image data for display, temporary calculation data such as calculation results data, and calculation result data. The arithmetic processing uses the memory H1 as a physical memory or may use virtual memory.

The display portion 5 displays image data transmitted based on the data stored in the memory H1. The display portion 5 is configured as at least one of a display, a printer device, a voice output device, a mobile terminal, and a wearable device, for example.

The CPU 91 reads and executes specified computer programs read to the memory H1 from the program databases (2, 3, and 4) and performs arithmetic processing such as searching for data in various databases (DB1 to DB8). The CPU 91 may be configured as one or more semiconductor chips or may be configured as a computer device such as a compute server.

The power system 12 illustrated in FIG. 2 includes a measuring instrument 10*a* and a measuring instrument 10*b* (hereinafter referred to as a measuring instrument 10). The measuring instrument 10 measures measurement values at various points in the power system and transmits the measurement result to the communication portion H2 of the system operation assisting device 1 via the communication network 11. The measurement result received by the system operation assisting device 1 is temporarily stored in the memory H1 and then is stored as measurement data D1 in the measurement data database DB1.

Examples of the measuring instrument 10 include measuring instruments and measuring devices such as PMU (Phasor Measurement Units), VT (Voltage Transformer), PT (Power Transformer), CT (Current Transformer), and Telemeter (TM: Telemeter) installed in the power system. The measuring instrument 10 may represent an aggregation device of measured values such as SCADA (Supervisory Control And Data Acquisition) installed in the power system.

The description below explains a processing flow of the system operation assisting device 1 according to the first embodiment.

Figure 6:
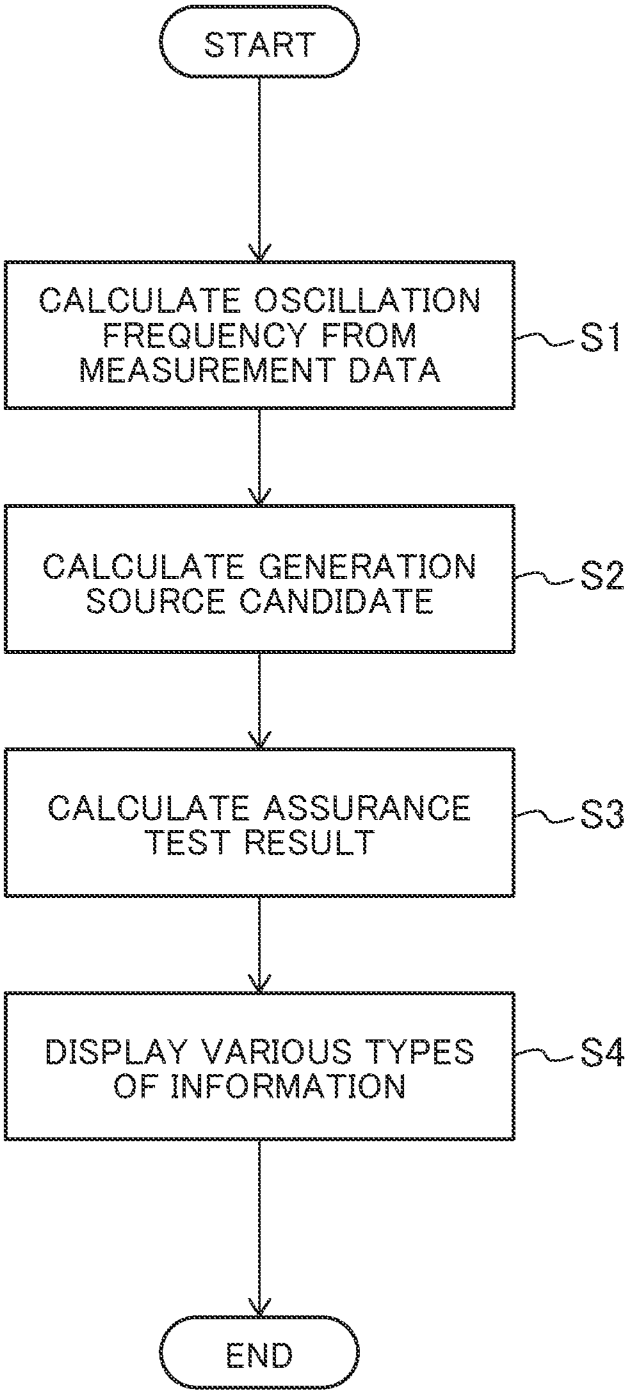
FIG. 6 is a diagram illustrating a processing flow that describes the overall processing of the system operation assisting device.

FIG. 6 illustrates a processing flow that describes the overall processing of the system operation assisting device 1. The contents will be described according to process steps S1 through S4.

Process step S1 calculates an oscillation frequency of the power system from the measurement data D1. Process step S1 will be described in detail with reference to FIGS. 7 through 10.

Figure 7:
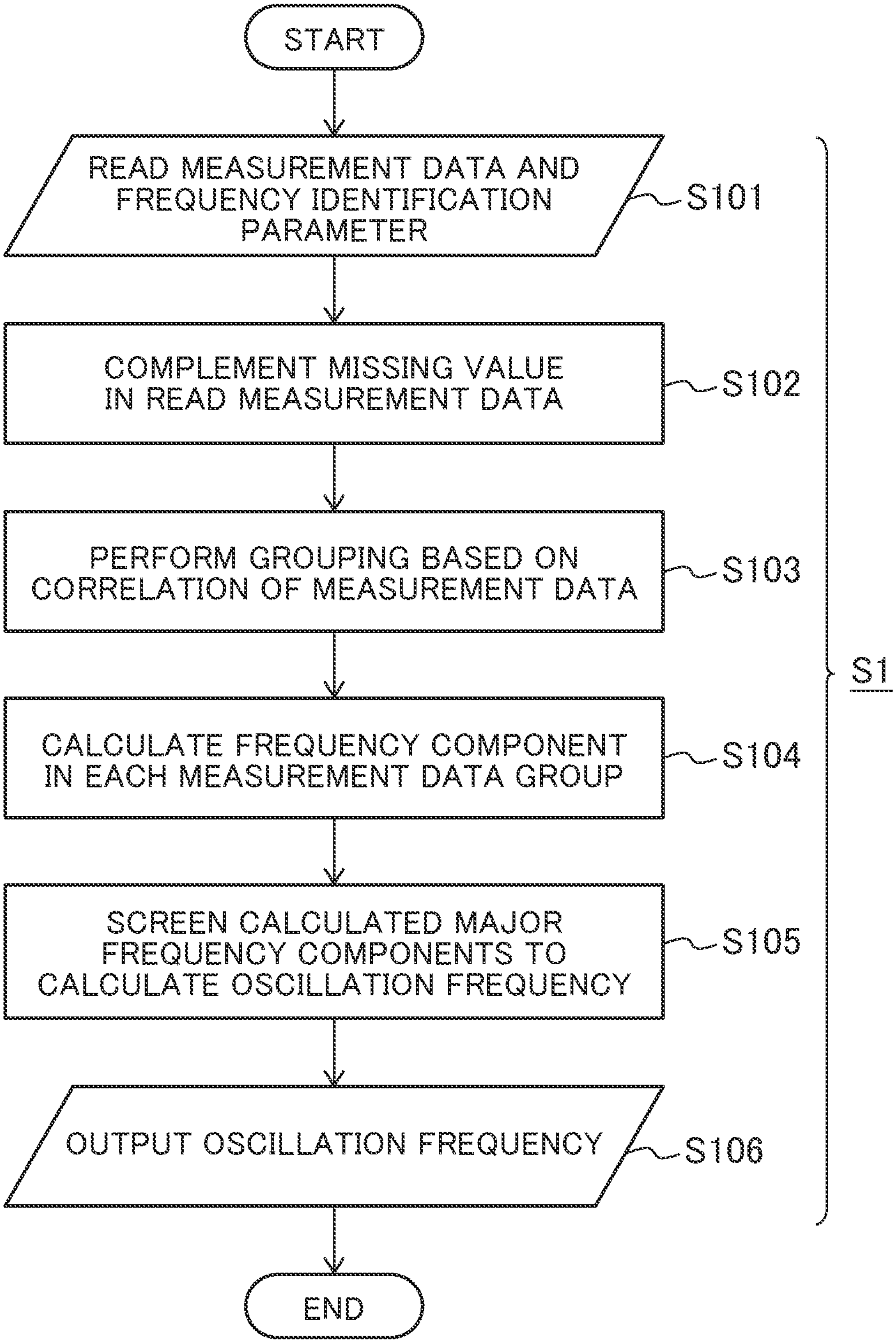
FIG. 7 is a diagram illustrating a processing flow in a multi-signal frequency identification portion.

FIG. 7 is a diagram illustrating a detailed processing flow of process step S1. Process step S101 reads the measurement data D1 and the frequency identification parameter D2. Process step S102 complements a missing value in the read measurement data D1. Process step S103 performs grouping based on the correlation of the measurement data D1. Process step S104 calculates a frequency component in each measurement data group. Process step S105 screens calculated major frequency components to calculate the oscillation frequency. Process step S106 outputs the oscillation frequency calculated at process step S105.

Process step S102 complements a missing value in part of the data. This is because the measurement data D1 is collected via the power system communication network and is likely to cause a packet loss. Instead, it may be favorable to use the matrix completion using a plurality of measurement points or a multiple-regression completion model for a plurality of measurement points, for example.

Figure 8:
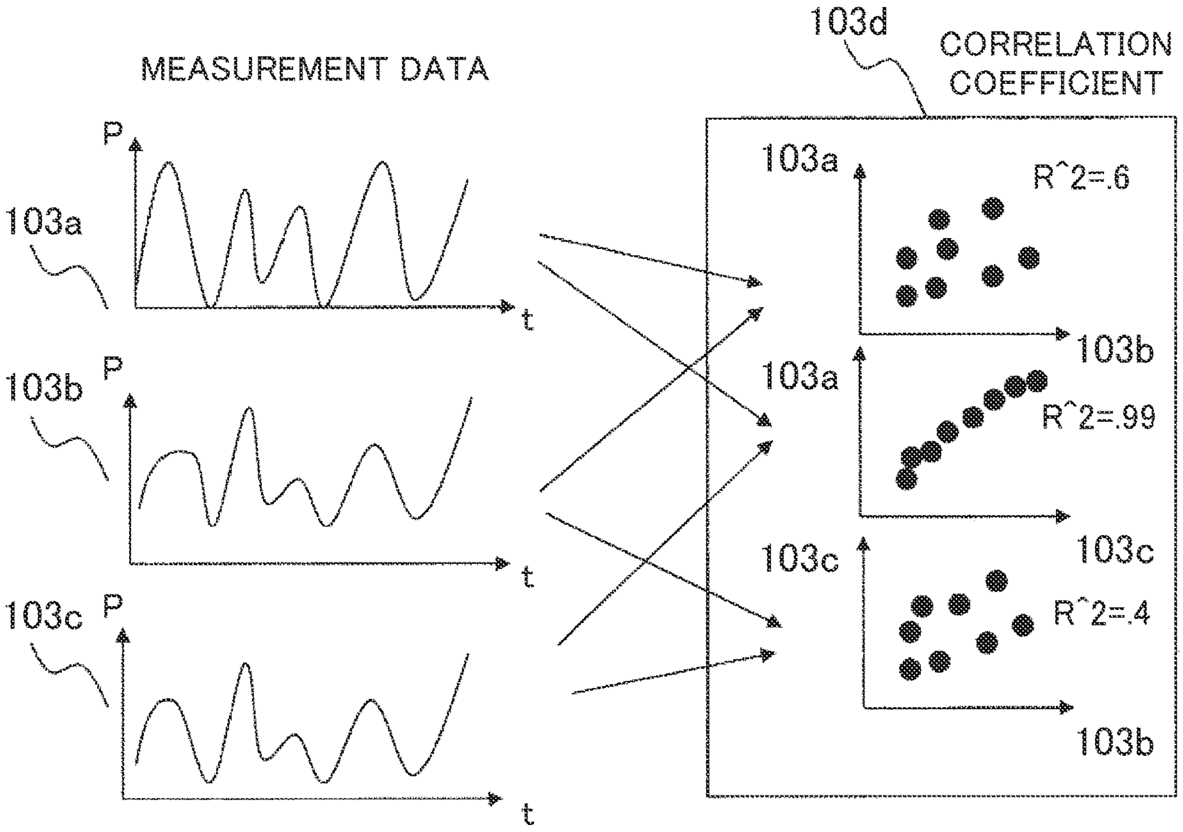
FIG. 8 is a diagram illustrating grouping in the multi-signal frequency identification portion.

FIG. 8 is a diagram illustrating process step S103. Suppose two or more signals of the same type are measured as the measurement data D1. The present embodiment describes an example of measuring active power P at a plurality of places. Data used as a grouping target may represent different signals such as A-phase and B-phase of a three-phase voltage from a single measuring instrument or may represent signals from a plurality of measuring instruments.

Correlation coefficient rxy between measured signals is calculated through the use of a correlation coefficient calculation equation (1).

[Math 1]

$$r_{xy}=\frac{\sum_{i=1}^{N}(X_i-\overline{X})(Y_i-\overline{Y})}{\sqrt{\sum_{i=1}^{N}(X_i-\overline{X})^{\wedge}2}\sqrt{\sum_{i=1}^{N}(Y_i-\overline{Y})^{\wedge}2}} \quad (1)$$

The correlation coefficient in equation (1) represents the linear correlation between signal X and signal Y. In the equation, rxy denotes the correlation coefficient (−1 to 1) between X and Y, and Xi and Yi denote i-th data samples from the respective signals. X and Y (both with overbar symbols in equation (1)) denote average values in the respective signals.

Figure 9:
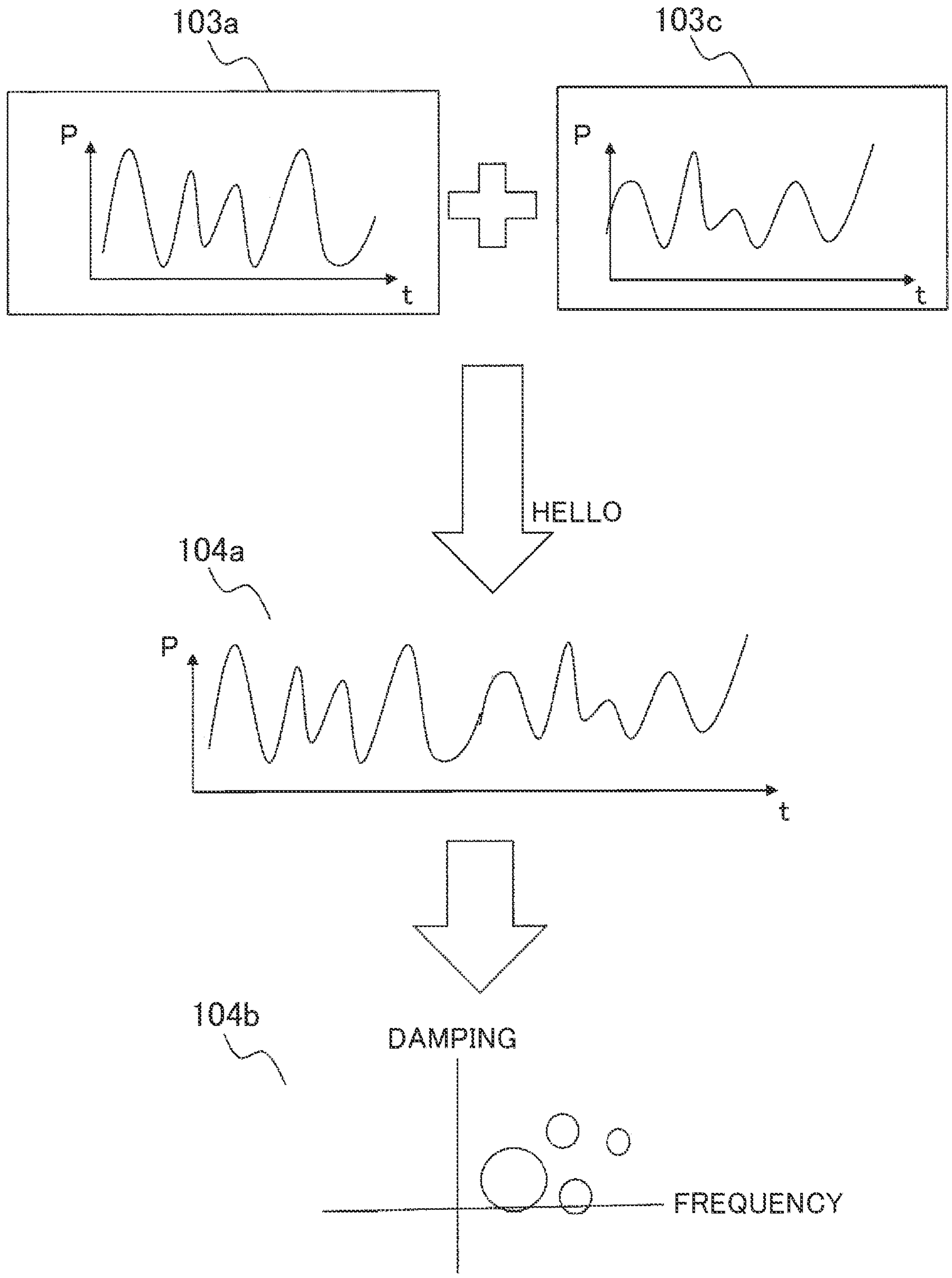
FIG. 9 is a diagram illustrating calculation of frequency components in the multi-signal frequency identification portion.

As above, the calculation of a correlation coefficient between signals makes it possible to calculate a signal group from two or more signals having a linear relationship, namely, a combination of signals including a common oscillation component and large correlation coefficients. The combination assigned a large correlation coefficient denotes a correlation coefficient of 0.8 or larger, for example FIG. 9 is a diagram illustrating process step S104. First, a single signal 103*a* and a single signal 103*c* of the measurement data D1 recognized as one group are combined into one signal to calculate an integrated signal 104*a*. Then, the frequency component 104*b* is calculated for the integrated signal 104*a*. According to the present embodiment, the calculation uses the Prony analysis. However, the analysis technique may use Fourier analysis or wavelet analysis. Consequently, it is possible to mathematically calculate frequency components even in a short analysis window.

Figure 10:
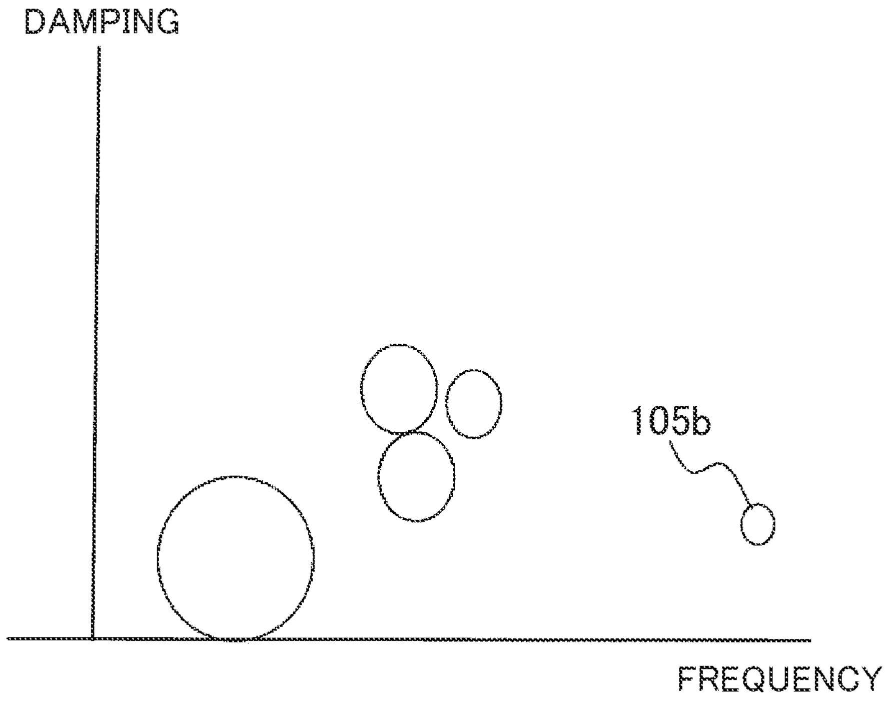
FIG. 10 is a diagram illustrating screening of major frequency components in the multi-signal frequency identification portion.

FIG. 10 is a diagram illustrating the screening at process step S105. Circles in the drawing represent frequency components. The size of a circle represents the amplitude, namely, the strength of a frequency component calculated in signal processing. Process step S105 performs screening to eliminate a frequency component that indicates a small amplitude width or a high attenuation rate. The purpose is to prevent the subsequent processing from being affected by a mathematical frequency component calculated from Prony analysis, Fourier analysis, or wavelet analysis, or by a frequency component that occurs in the system and does not originally exist in the measurement data DB1. The frequency component screened here is assumed to be the oscillation frequency D6.

Process step S2 will be described in detail with reference to FIGS. 11 through 14.

Figure 11:
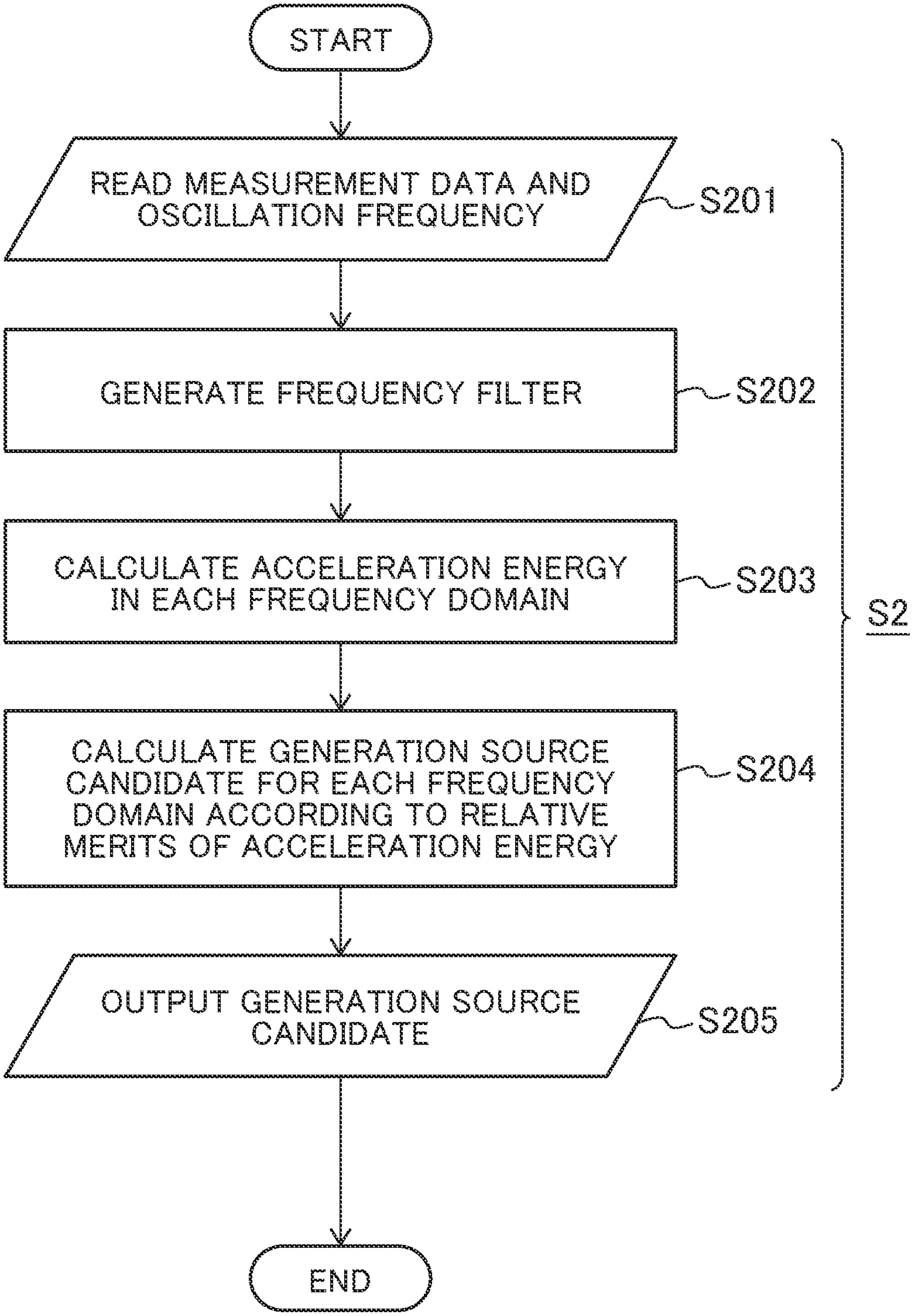
FIG. 11 is a diagram illustrating a processing flow in a generation source candidate calculation portion.

FIG. 11 is a diagram illustrating a detailed processing flow of process step S2. Process step S201 reads the measurement data D1 and the oscillation frequency D6 calculated at process step S105. Process step S202 generates a frequency filter. The frequency filter uses a bandpass filter targeted at only specific frequencies, for example. Process step S203 calculates the acceleration energy in each frequency domain. Process step S204 calculates the generation source candidate D7 for each frequency domain according to the relative merits of the acceleration energy. Process step S205 outputs the generation source candidate D7.

Figure 12:
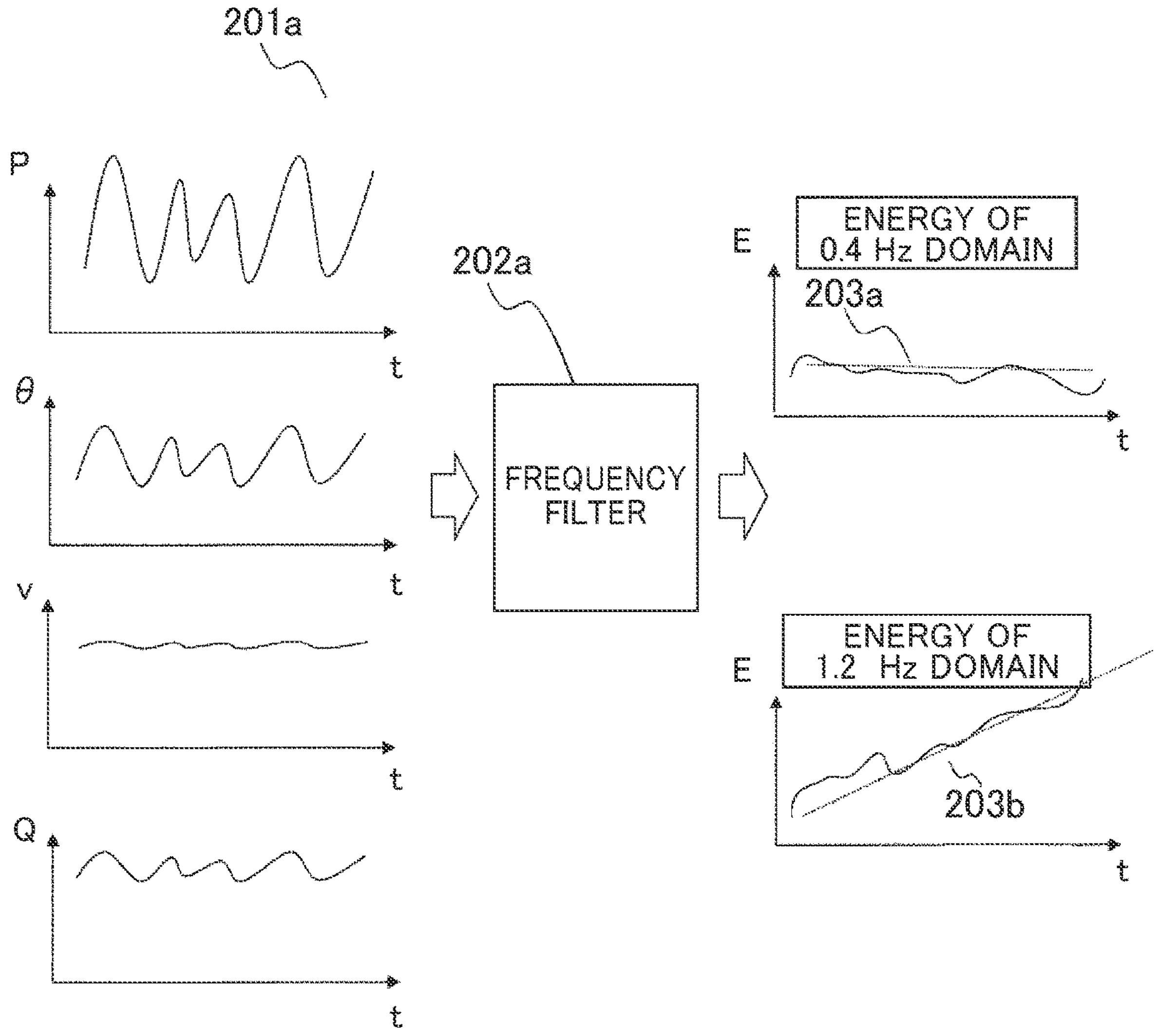
FIG. 12 is a diagram illustrating calculation of acceleration energy in a frequency domain of the generation source candidate calculation portion.

FIG. 12 is a diagram illustrating the details of process steps S202 and S203. For example, the measurement data D1 may store active power P, reactive power Q, voltage V, and phase θ of the power system. In such a case, process step S202 calculates energy W of each region by using equation (2) using a bandpass filter based on the oscillation frequency.

[Math 2]

$$W_{ij}^{D}=\int 2\pi\Delta P_{ij}d\Delta f_i+\Delta Q_{ij}\frac{d(\Delta V_i)}{V_i^*} \quad (2)$$

Process step S203 calculates the acceleration energy, namely, gradients 203*a* and 203*b* of the energy calculated by the above equation, by using equation (3).

[Math 3]

$$W_{ij}^{D}(t)=DE^{*}_{ij}{}^{*}t+b_{ij} \quad (3)$$

Equations (2) and (3) are described in nonpatent literature 1.

Consequently, the generation source can be calculated for each frequency domain of each unstable oscillation. The generation source of unstable oscillation injects the acceleration energy that makes the power system unstable. Calculation of the acceleration energy makes it possible to identify the generation source of unstable oscillation.

FIG. 13 is a diagram illustrating acceleration energy 203. The acceleration energy is calculated for each bus or each region. A positive value eventually injects energy into the power system and is therefore assumed to be a generation source candidate. If there are multiple positive values, the power system is considered to include multiple generation sources. An influence rate of the generation sources is calculated based on the ratio thereof.

FIG. 14 is a diagram illustrating the generation source candidate D7. The presence of multiple generation source candidates D7, if any, is emphasized by indicating highly contributive candidates based on the display order or tags, for example.

Process step S3 calculates the result of the assurance test. Process step S3 will be described in detail with reference to FIGS. 15 through 18.

Figure 15:
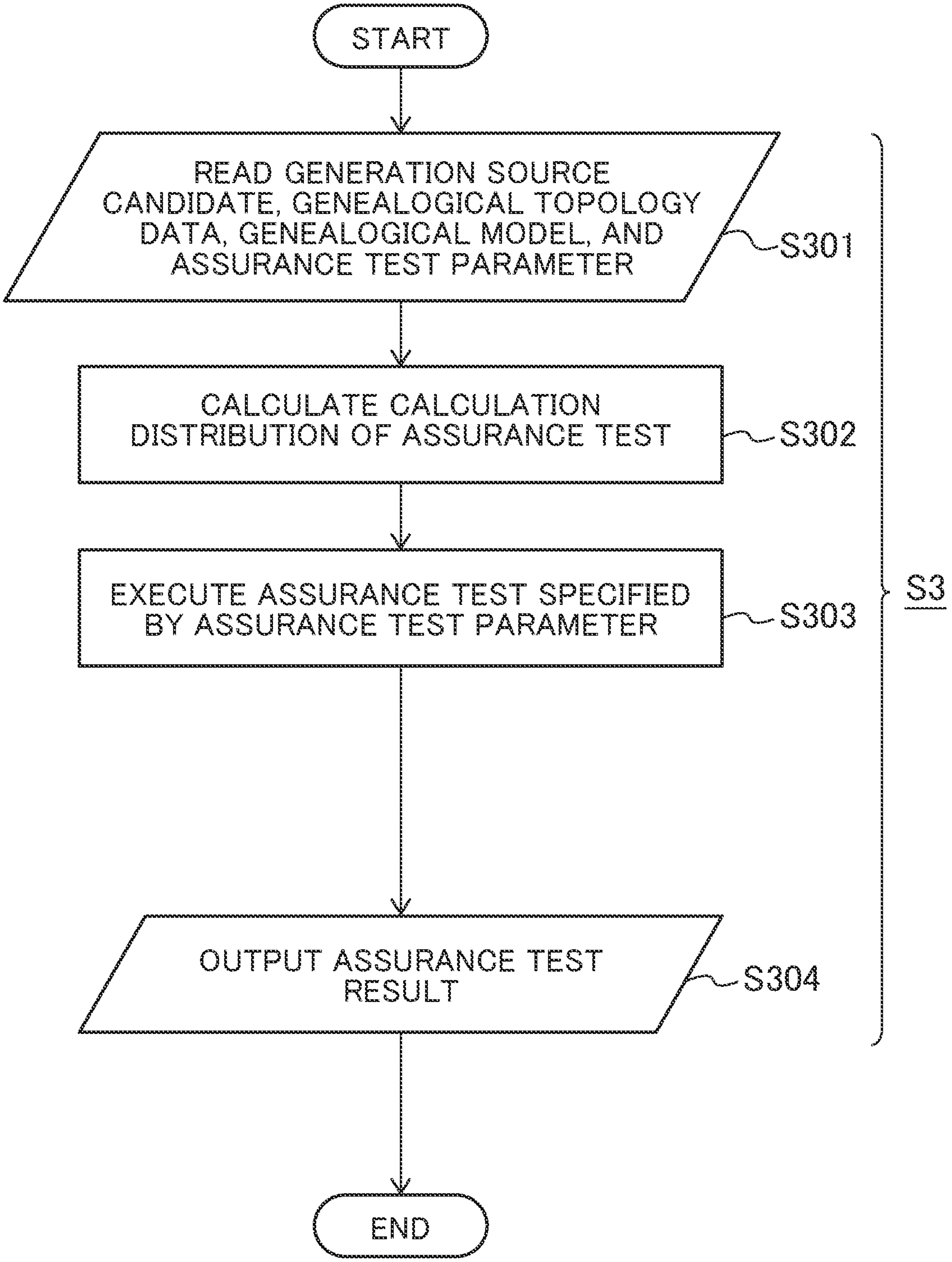
FIG. 15 is a diagram illustrating a processing flow in a generation source assurance test.

FIG. 15 is a diagram illustrating a detailed processing flow of process step S3. Process step S301 reads the generation source candidate D7, the genealogical topology data D3, a genealogical model D4, and the assurance test parameter D5. Step S302 calculates the calculation distribution of the assurance test. Process step S303 executes the assurance test specified by the assurance test parameter. Process step S304 outputs an assurance test result.

There are types of assurance tests such as a mode clustering test that analyzes a frequency component by machine learning and calculates the frequency component of the unstable oscillation generation source; a simulation reproduction test that reproduces unstable oscillation by simulation; and a traveling wave test that finds a generation source from the propagation of unstable oscillation. These tests are performed to calculate a result of comparison with results from the use of other generation source identification means.

Figure 16:
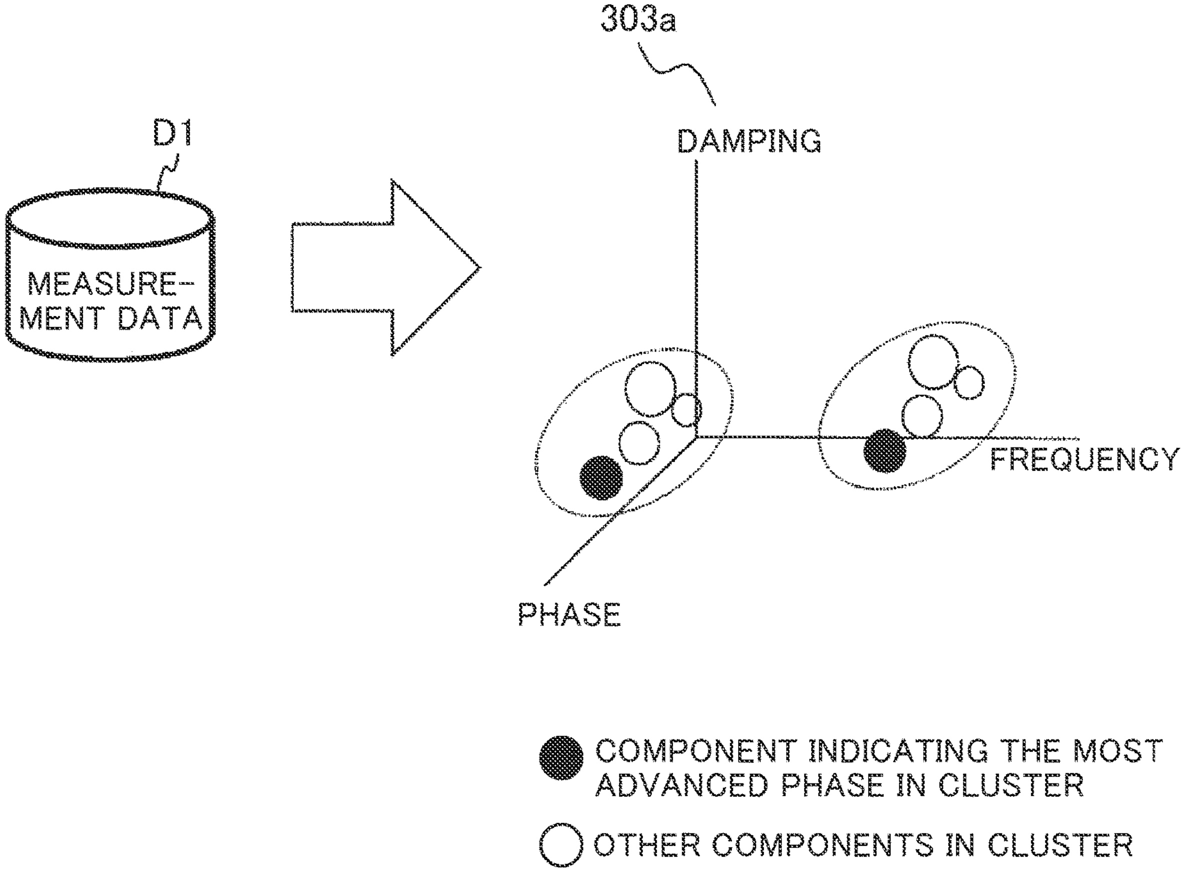
FIG. 16 is a diagram illustrating an assurance test result of the generation source assurance test.

FIG. 16 is a diagram illustrating the mode clustering test. A machine learning algorithm is used to cluster frequency components acquired from the measurement data D1 and assumes each cluster indicating the most advanced phase to be the generation source. The cluster is compared with the generation source candidate D7.

Figure 17:
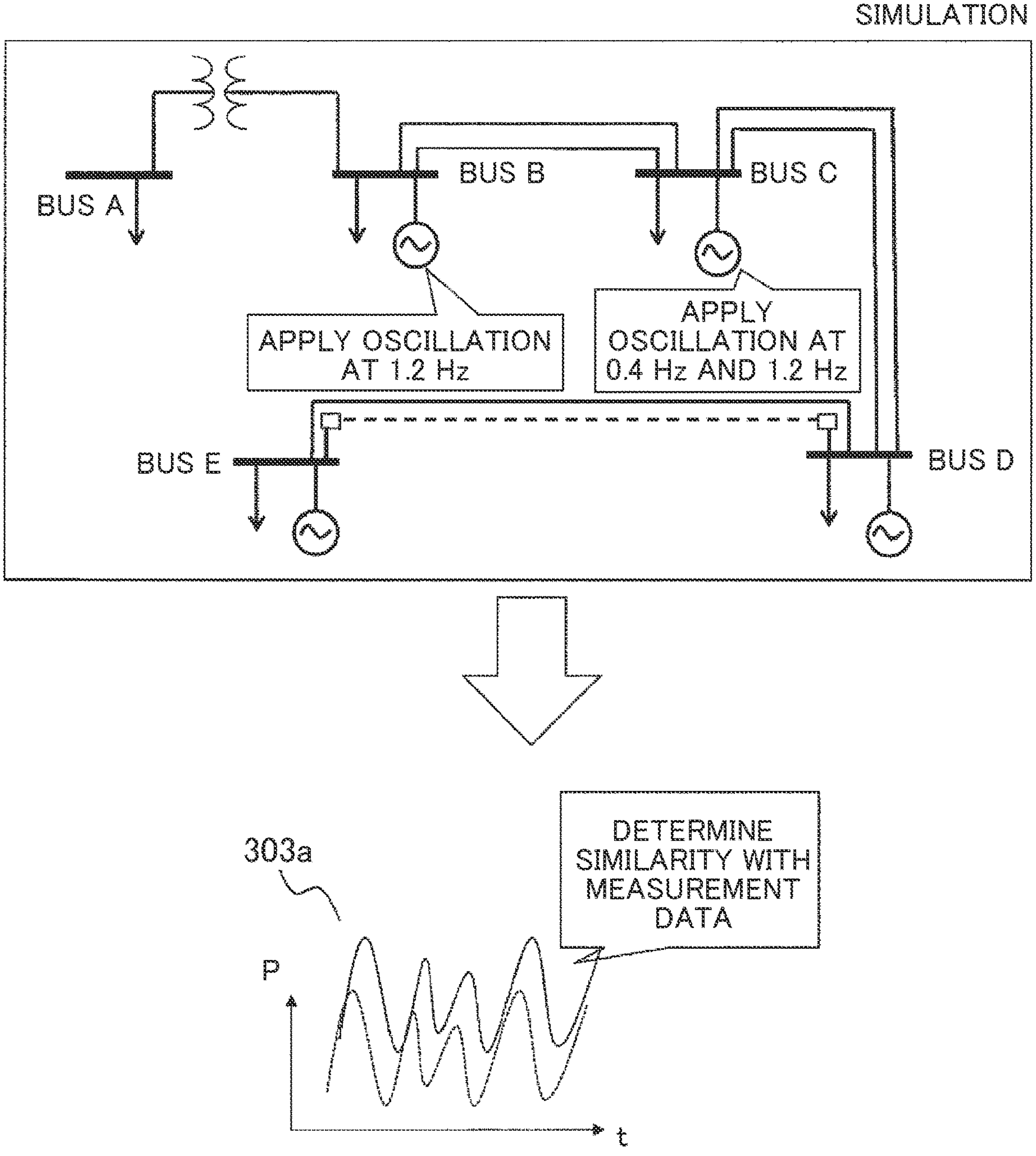
FIG. 17 is a diagram illustrating the principle of a mode clustering test as an example assurance test in a generation source assurance test.

FIG. 17 is a diagram illustrating the simulation reproduction test. This test reproduces unstable oscillation of the power system by using a generation source candidate D6, the genealogical model D4, and genealogical topology data. The assurance test of generation source candidates is performed by comparing the simulation data acquired from this simulation with the measurement data D1 and determining the similarity.

FIG. 18 is a diagram illustrating an assurance test result D8. As shown in FIG. 16, the result accumulates results of comparison with the tests. The assurance test result D8 can pursue the generation source of unstable oscillation from different viewpoints, making it possible to assure that the candidates are correct.

Figure 19:
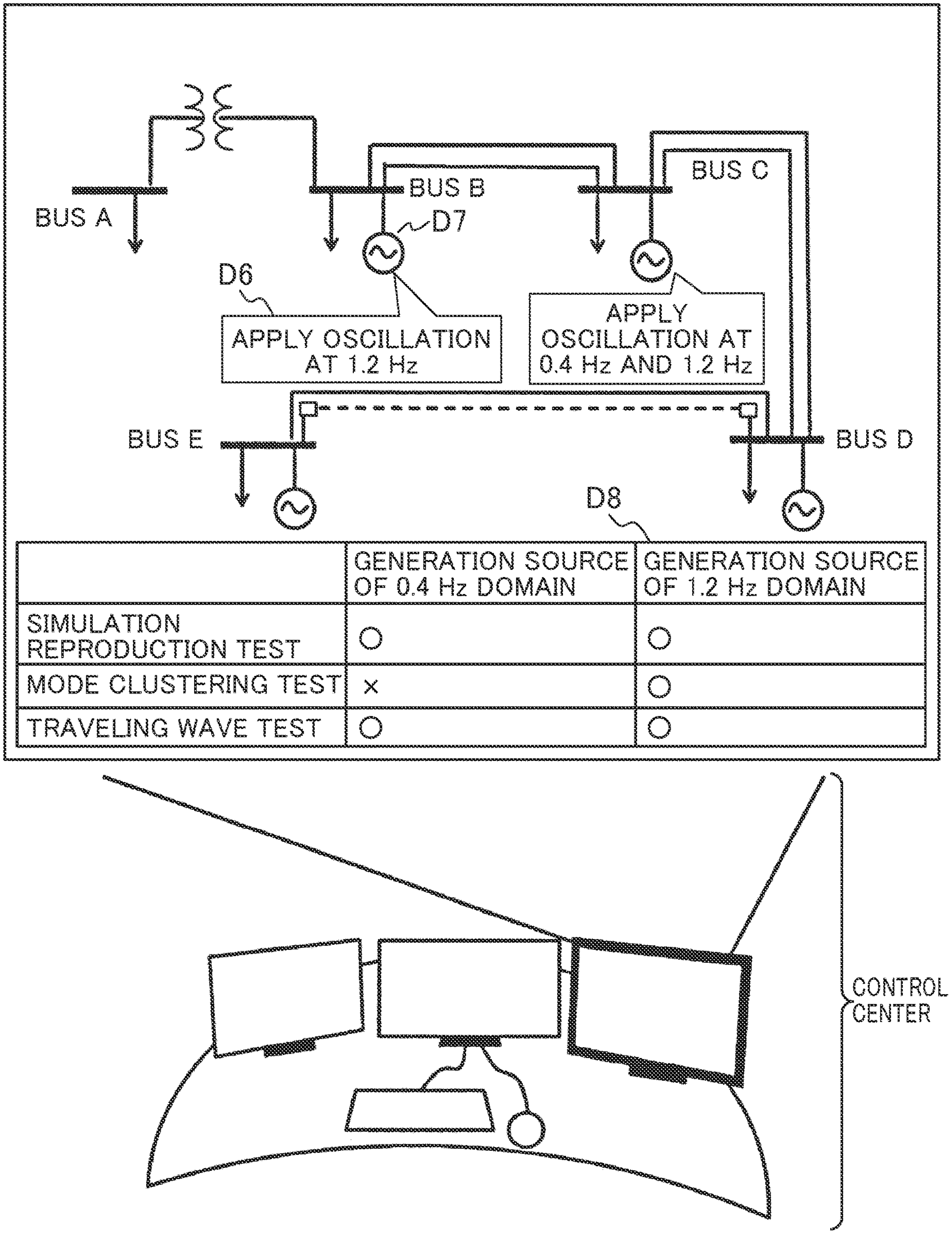
FIG. 19 is a diagram illustrating a display screen.

Process step S4 displays the calculated result on the display portion 5. FIG. 19 is a diagram illustrating a concrete example of the display. The display portion 5 is viewed by a system operator in the control center, for example. The display portion 5 includes a GUI to display the oscillation frequency D6, the generation source candidate D7, and the assurance test result D8. These pieces of information may be displayed on a power system diagram, may be displayed as a log or a table, or may be displayed on a map.

The description below explains the effects of the present embodiment.

According to the present embodiment, the multi-signal frequency identification portion ensures the high-speed performance concerning the oscillation frequency and generation source candidates. This is because a group of measurement signals is generated to enable even a short analysis window to maintain frequency identification accuracy. Consequently, it is possible to shorten the signal processing time from the occurrence of unstable oscillation to the measurement of a frequency of the unstable oscillation as measurement data.

The accuracy of the generation source can be determined by viewing the assurance test result, enabling an operator to quickly suppress the unstable oscillation.

The generation source candidate test portion 4 performs the assurance test on generation source candidates calculated in the generation source candidate calculation portion 3. This makes it possible to more accurately identify the generation source of unstable oscillation.

When the power system operator confirms the display portion 5, the operator can easily confirm the oscillation frequency of the unstable oscillation currently occurring in power system operations of the power system, generation source candidates of the same, and assurance test results.

Second Embodiment

The second embodiment provides a configuration example of applying the power system operation assisting device 1 of the first embodiment to the oscillation suppression system.

Figure 20:
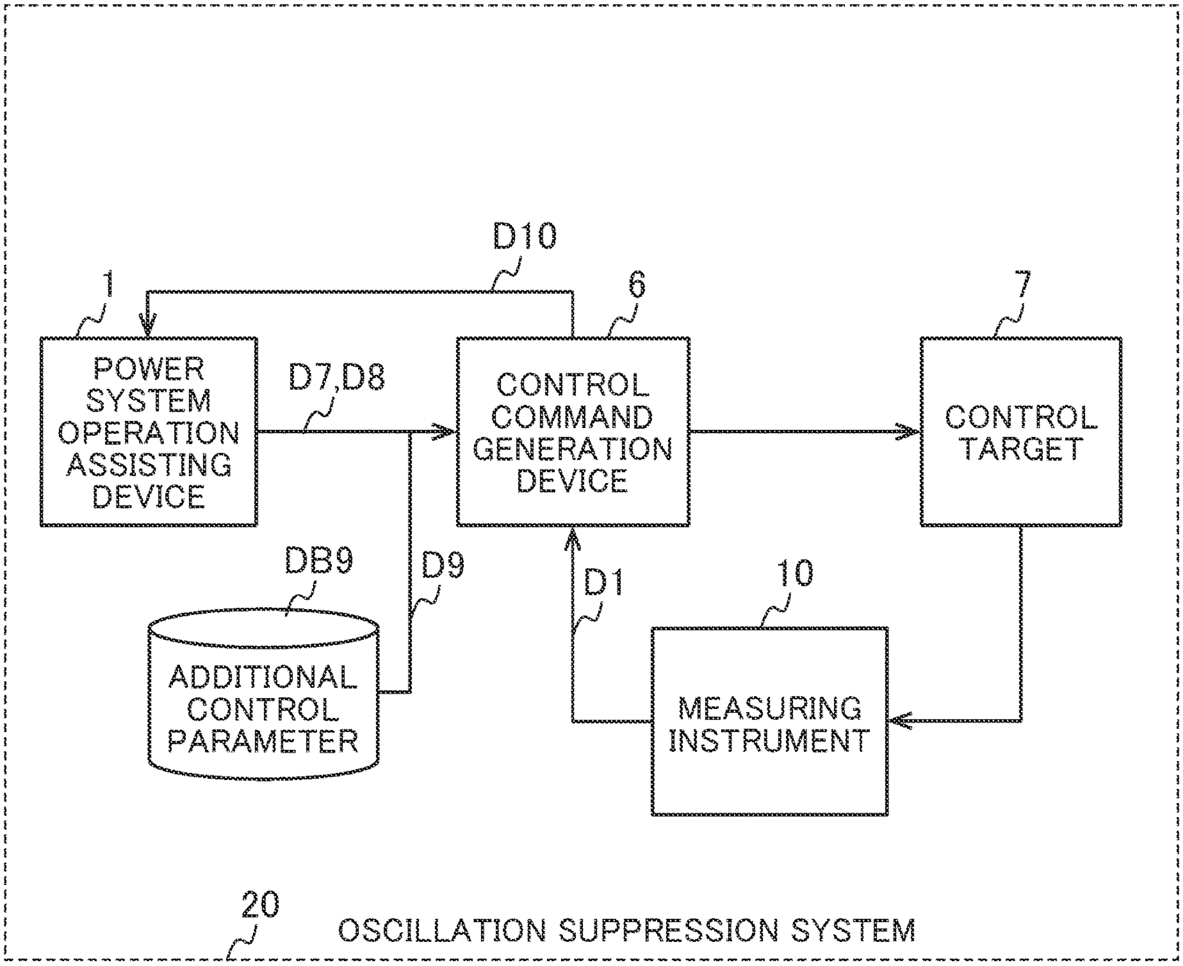
FIG. 20 is a diagram illustrating an overall configuration of an oscillation suppression system 20 according to a second embodiment.

FIG. 20 is a diagram illustrating a configuration of the oscillation suppression system 20. The oscillation suppression system 20 includes a control command generation device 5, a control target 7, and the measuring instrument 10. The control command generation device 5 generates control commands by using inputs such as various outputs from the power system operation assisting device 1, the control parameter D9, and the measurement data D1. The control target 7 (comparable to the measurement target of the first embodiment) executes the control command as input. The measuring instrument 10 acquires the measurement data D1 of the control target 7. The following omits the other descriptions common to the power system operation assisting device 1 in FIG. 1.

The control parameter D9 contains a control rule for suppression, a rule to generate an alternative control command when the effect of the control is insufficient, and the number of times to be able to generate the alternative control command. The rule to generate a control command for suppression and the rule to generate the alternative control command may be provided as a data table or an algorithm including logics, for example.

Figure 21:
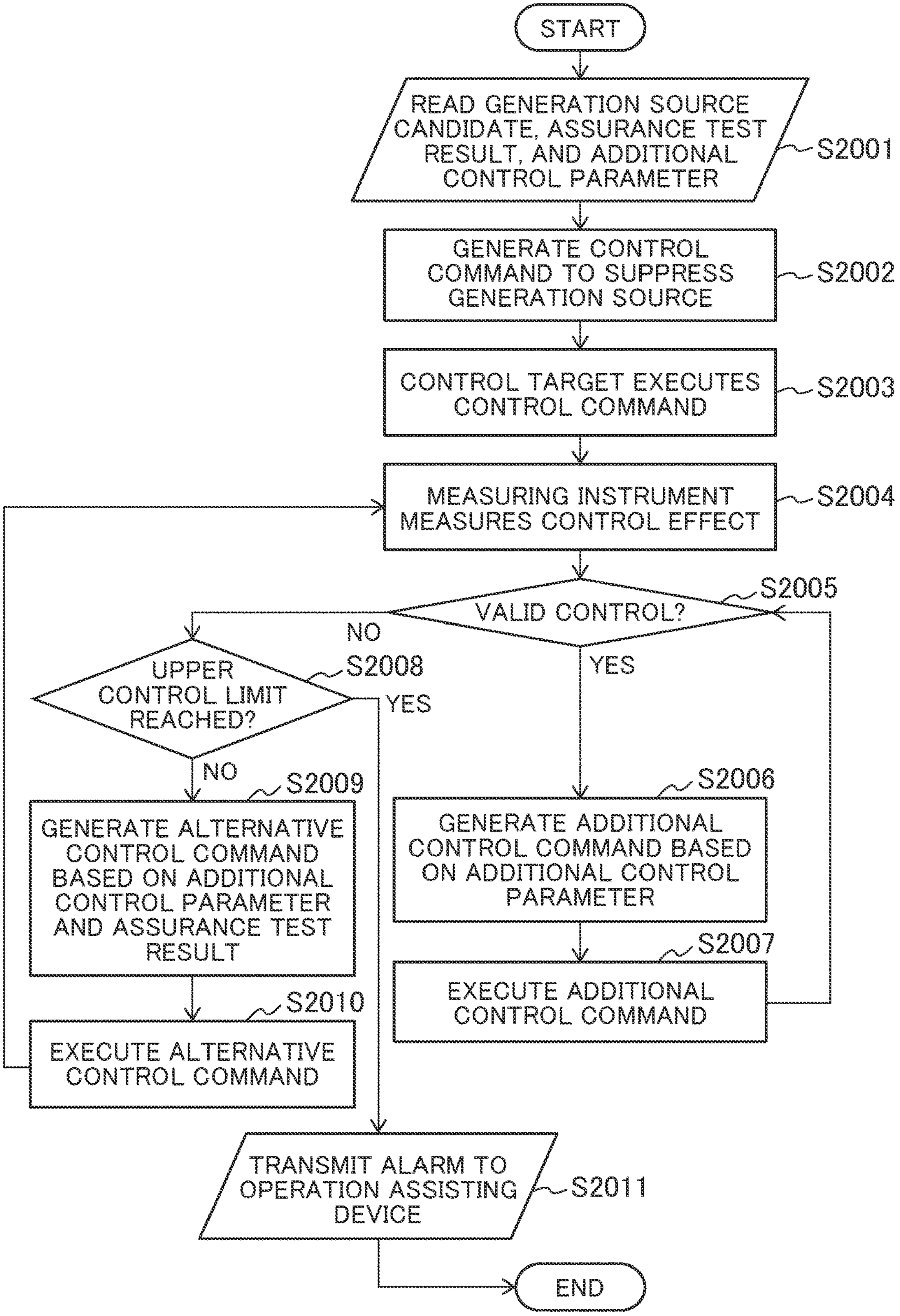
FIG. 21 is a diagram illustrating a processing flow in the oscillation suppression system 20 according to the second embodiment.

FIG. 21 is a diagram illustrating a processing flow according to the present embodiment.

Process step S2001 reads a generation source candidate, an assurance test result, and an additional control parameter. Process step S2002 generates a control command to suppress the generation source. At process step S2003, a control target operates based on the control command. At process step S2004, the measuring instrument measures the control effect.

Process step S2005 evaluates whether the control is valid. For example, an evaluation method evaluates the oscillation damping effect. If the result of the process step S2005 is YES, it is determined that the control is effective. Control proceeds to process step S2006. Process step S2006 generates an additional control command based on the additional control parameter. Process step S2007 executes the additional control command and terminates the process.

If the result of process step S2005 is NO, control proceeds to process step S2008. Process step S2008 determines whether a upper control limit (data stored in the additional control parameter D9) is reached. If process step S2008 results in YES, control proceeds to process step S2011. If process step S2008 results in NO, control proceeds to process step S2009. Process step S2009 generates an alternative control command based on the additional control parameter (the rule to generate an alternative control command). Process step S2010 executes the alternative control command and returns to process step S2004. Process step S2011 transmits an alarm to the power system operation assisting device.

The effects of the present embodiment will be described. The generation source identified in the power system operation assisting device 1 and the assurance test do not always identify a reliable generation source. It is risky to rely on one-time control to isolate the generation source and suppress the oscillation. The present embodiment first controls an assumed generation source and then, based on the result, determines whether to change the control target or perform additional control using the same control target. When the control for oscillation suppression is effective, it is possible to fast suppress the oscillation by performing the additional control on the same control target. If the initial control for oscillation suppression is ineffective, a control command is generated for another generation source candidate. If any control command has no effect, an alarm can be issued to notify the power system operator and the power system operation portion 1 of an abnormal situation. This makes it possible to deal more quickly with generation sources of the unstable oscillation.

LIST OF REFERENCE SIGNS

1: power system operation assisting device
2: multi-signal frequency identification portion
3: generation source candidate calculation portion
4: generation source assurance test portion
5: display portion
6: control command generation device
7: control target
10: measuring instrument
11: communication network
12: power system
91: CPU
DB1: measurement data database
DB2: frequency identification parameter database
DB3: genealogical topology database
DB4: genealogical model database
DB5: assurance test parameter database
DB6: oscillation frequency database
DB7: generation source candidate database
DB8: assurance test result database
DB9: additional control parameter database
DB10: alarm
H1: memory
H2: communication portion
H3: input portion
H4: bus

The invention claimed is:

1. An oscillation suppression system comprising:

a multi-signal frequency identification portion that calculates an oscillation frequency by using input of at least one of measurement data for a measurement target and a frequency identification parameter to calculate a frequency component of the measurement data;

a generation source candidate calculation portion that calculates a generation source candidate of unstable oscillation occurring in a power system by using input including a calculated oscillation frequency;

a generation source assurance test portion that calculates an assurance test result concerning the generation source candidate; and a display portion that displays the oscillation frequency, the generation source candidate, and the assurance test result;

a measuring instrument that acquires measurement data of the measurement target;

a control command generation device that generates a control command by using input including at least one of the generation source candidate, the assurance test result, a control parameter to generate the control command for the measurement target, and the measurement data, wherein the measurement target that executes control by using the control command as input, wherein the measuring instrument measures whether control executed based on the control command is effective, wherein, when control is determined to be effective, the control command generation device generates an additional control command, and wherein, when control is determined to be not effective, the control command generation device generates an alternative control command on condition of a upper control limit not reached and issues an alarm to the power system operation assisting device on condition of a upper control limit reached.

2. The oscillation suppression system according to claim 1, wherein the multi-signal frequency identification portion generates a measurement data group generated based on a correlation of the measurement data, calculates a frequency component of the measurement data group, and screens major frequency components to calculate the oscillation frequency.

3. The oscillation suppression system according to claim 1, wherein the multi-signal frequency identification portion calculates a frequency component by using at least one of Prony analysis, Fourier analysis, and wavelet analysis.

4. The oscillation suppression system according to claim 1, wherein the generation source candidate calculation portion calculates acceleration energy in a frequency domain by using input including the measurement data and the oscillation frequency and calculates a generation source candidate based on the magnitude thereof.

5. The oscillation suppression system according to claim 1, wherein the generation source assurance test portion calculates an assurance test result of the generation source candidate by using input including at least one of a calculated generation source candidate, genealogical topology data, a genealogical model, and an assurance test parameter.

6. The oscillation suppression system according to claim 1, wherein the assurance test parameter includes at least one of a mode clustering test to calculate a frequency component of a generation source, a simulation reproduction test to reproduce unstable oscillation by simulation, and a traveling wave test to find a generation source based on the propagation of unstable oscillation.

7. The oscillation suppression system according to claim 1, wherein the control parameter includes at least one of a control rule to suppress oscillation, a rule to generate another control command, and the number of times to be able to generate the other control command.

8. An oscillation suppression method comprising the steps of:

calculating an oscillation frequency by using input including at least one of measurement data for a measurement target and a frequency identification parameter to calculate a frequency component of the measurement data;

calculating a generation source candidate of unstable oscillation occurring in a power system by using input including a calculated oscillation frequency;

calculating an assurance test result concerning the generation source candidate;

displaying the oscillation frequency, the generation source candidate, and the assurance test result;

acquiring, by a measuring instrument, measurement data of the measurement target;

generating, by a control command generation device, a control command by using input including at least one of the generation source candidate, the assurance test result, a control parameter to generate the control command for the measurement target, and the measurement data;

wherein the measurement target that executes control by using the control command as input, wherein the measuring instrument measures whether control executed based on the control command is effective, wherein, when control is determined to be effective, the control command generation device generates an additional control command, and wherein, when control is determined to be not effective, the control command generation device generates an alternative control command on condition of a upper control limit not reached and issues an alarm to the power system operation assisting device on condition of a upper control limit reached.

9. The oscillation suppression method of claim 8, further comprising the steps of:

acquiring measurement data of the measurement target;

generating a control command by using input including the generation source candidate and the assurance test result calculated by the power system operation assisting method according to claim 8, a control parameter to generate the control command for the measurement target, and the measurement data; and executing control by using the control command as input.

* * * * *